United States Patent
D'Aguanno

(10) Patent No.: US 10,174,516 B2
(45) Date of Patent: Jan. 8, 2019

(54) MULTI-FUNCTIONAL SUBMERSIBLE VACUUM

(71) Applicant: Matthew P. D'Aguanno, Port Washington, NY (US)

(72) Inventor: Matthew P. D'Aguanno, Port Washington, NY (US)

( * ) Notice: Subject to any disclaimer, the term of this patent is extended or adjusted under 35 U.S.C. 154(b) by 0 days.

(21) Appl. No.: 15/233,030

(22) Filed: Aug. 10, 2016

(65) Prior Publication Data

US 2018/0044935 A1    Feb. 15, 2018

Related U.S. Application Data

(60) Provisional application No. 62/197,386, filed on Jul. 27, 2015.

(51) Int. Cl.

| | |
|---|---|
| *E04H 4/16* | (2006.01) |
| *B01D 35/02* | (2006.01) |
| *B01D 35/26* | (2006.01) |
| *B01D 35/14* | (2006.01) |
| *B01D 35/15* | (2006.01) |
| *B01D 29/11* | (2006.01) |
| *B01D 35/30* | (2006.01) |
| *H02K 5/132* | (2006.01) |
| *H01R 13/523* | (2006.01) |
| *B01D 35/143* | (2006.01) |
| *B01D 35/153* | (2006.01) |

(52) U.S. Cl.
CPC ......... *E04H 4/1636* (2013.01); *B01D 29/117* (2013.01); *B01D 35/02* (2013.01); *B01D 35/143* (2013.01); *B01D 35/153* (2013.01); *B01D 35/26* (2013.01); *B01D 35/30* (2013.01); *H01R 13/523* (2013.01); *H02K 5/132* (2013.01)

(58) Field of Classification Search
CPC ...... E04H 4/1636; B01D 35/02; B01D 35/26; B01D 35/143; B01D 35/153; B01D 29/117; B01D 35/30; C02F 1/001; C02F 2103/42; C02F 2201/002; C02F 2209/40; H02K 5/132; H01R 13/523
USPC ....... 210/167.6, 167.17, 416.1, 416.2; 15/1.7
See application file for complete search history.

(56) References Cited

U.S. PATENT DOCUMENTS

| | | | |
|---|---|---|---|
| 3,572,784 A * | 3/1971 | Pansini | A47L 9/325 15/1.7 |
| 3,868,739 A | 3/1975 | Hargrave | |
| 4,240,173 A | 12/1980 | Sherrill | |
| 4,637,086 A | 1/1987 | Goode | |
| 4,718,129 A | 1/1988 | Miller | |
| 4,962,559 A | 10/1990 | Schuman | |
| 6,539,573 B1 * | 4/2003 | Caccavella | E04H 4/1654 15/1.7 |
| 6,797,157 B2 | 9/2004 | Erlich | |
| 6,939,460 B2 | 9/2005 | Erlich | |
| D518,253 S | 3/2006 | Erlich et al. | |
| 7,060,182 B2 | 6/2006 | Erlich et al. | |

(Continued)

*Primary Examiner* — Fred Prince
(74) *Attorney, Agent, or Firm* — Carter, Deluca, Farrell & Schmidt, LLP

(57) ABSTRACT

A liquid-submersible vacuum system includes a housing canister enclosing a filtration element and a water pump. Power comes from a power converter that plugs into a standard AC power supply. The vacuum system further includes a diffuser cap and a discharge hose cap, with each providing the vacuum system with a discrete mode of operation.

18 Claims, 8 Drawing Sheets

PARTS LIST

(56) References Cited

U.S. PATENT DOCUMENTS

| | | | | |
|---|---|---|---|---|
| 7,437,790 B1* | 10/2008 | Ajello | .................. | E04H 4/1636 |
| | | | | 15/1.7 |
| 7,520,015 B1 | 4/2009 | Ajello | | |
| 8,281,441 B1 | 10/2012 | Erlich et al. | | |
| D685,542 S | 7/2013 | Erlich et al. | | |
| D720,101 S | 12/2014 | Erlich et al. | | |
| 2003/0159723 A1* | 8/2003 | Hui | ...................... | E04H 4/1654 |
| | | | | 134/167 R |
| 2005/0279683 A1* | 12/2005 | Erlich | .................. | E04H 4/1636 |
| | | | | 210/167.16 |
| 2011/0000731 A1* | 1/2011 | Boeckler | ................ | B62B 1/002 |
| | | | | 180/220 |
| 2011/0247970 A1* | 10/2011 | Evingham | .............. | B01D 29/21 |
| | | | | 210/85 |
| 2016/0326763 A1* | 11/2016 | Bruneel | ................ | E04H 4/1672 |
| 2017/0260766 A1* | 9/2017 | Hui | ...................... | E04H 4/1636 |

\* cited by examiner

PARTS LIST
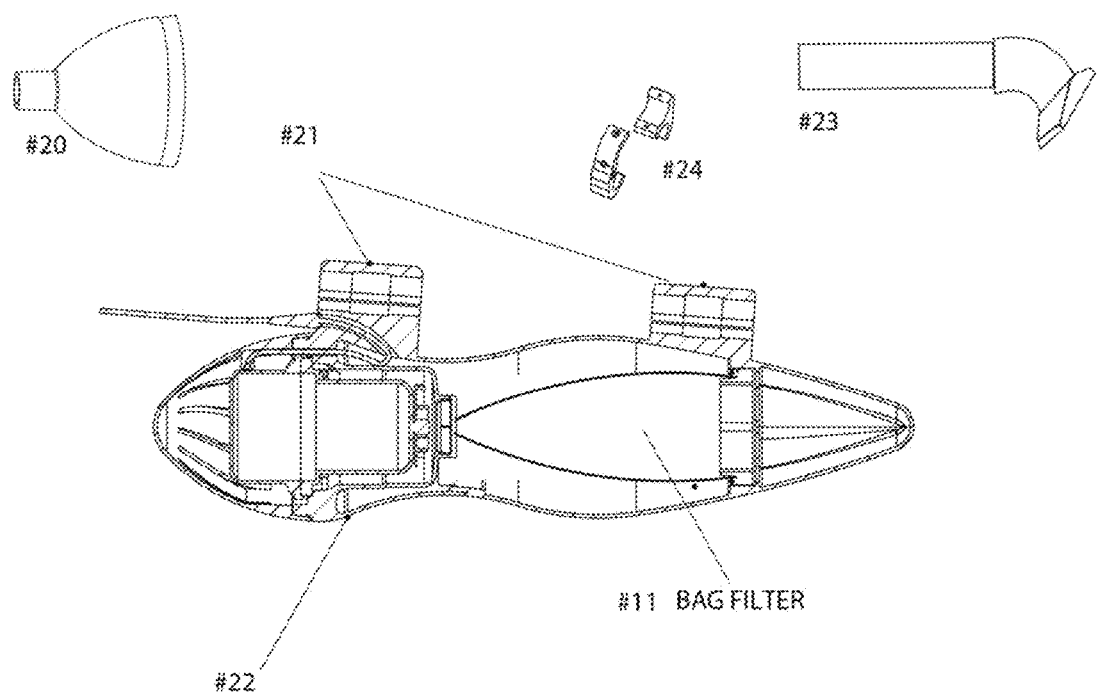
FIGURE #1

PARTS LIST
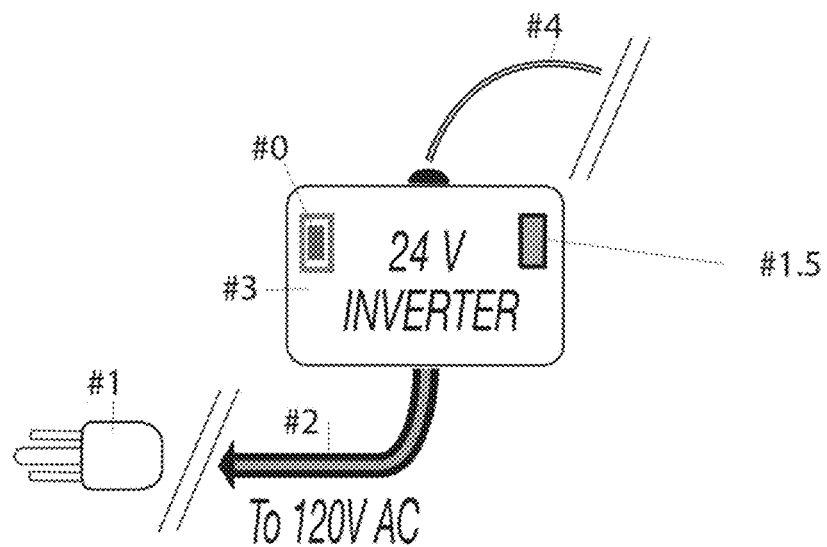
FIGURE #2

PARTS LIST
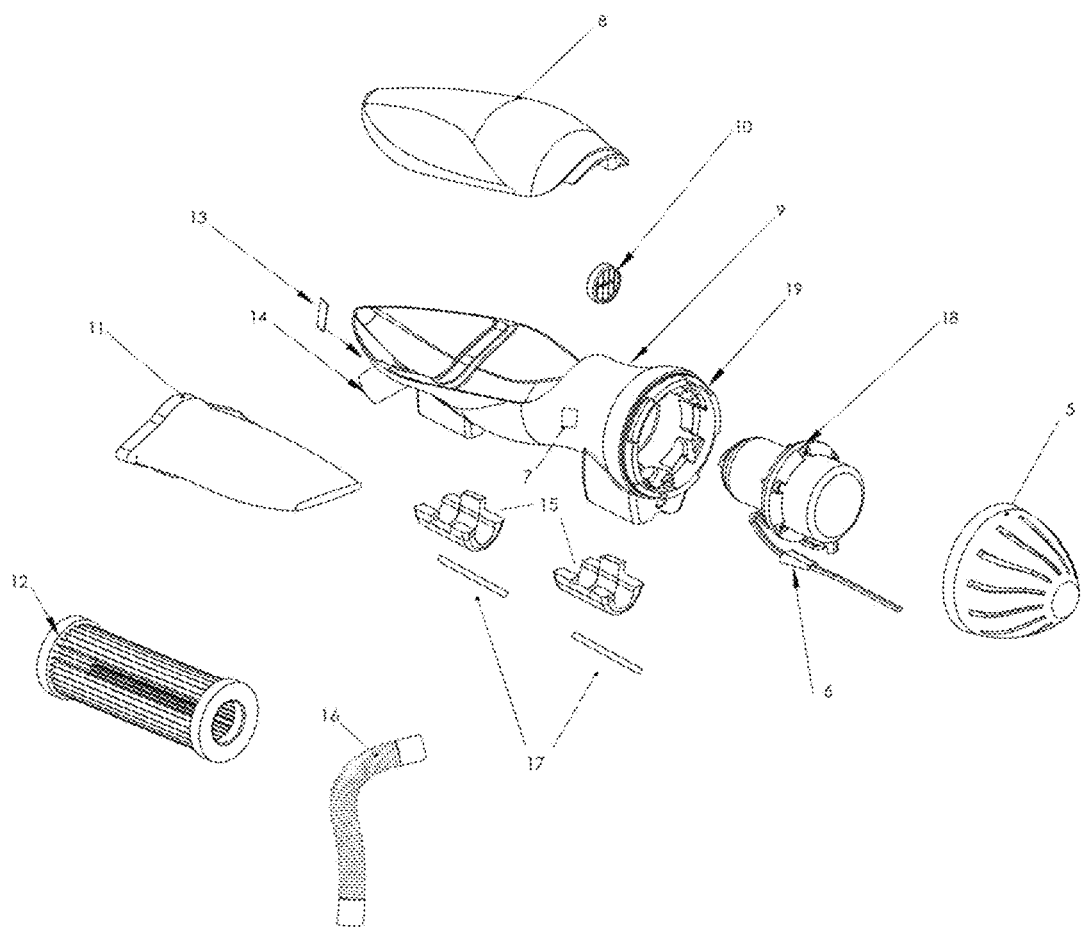
FIGURE #3

PARTS LIST
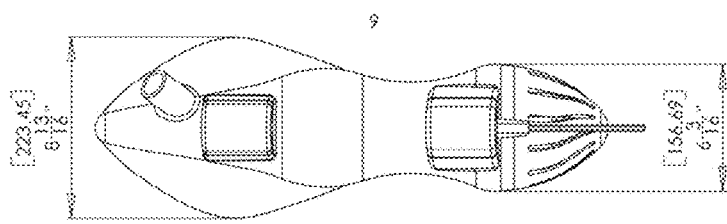
TOP VIEW
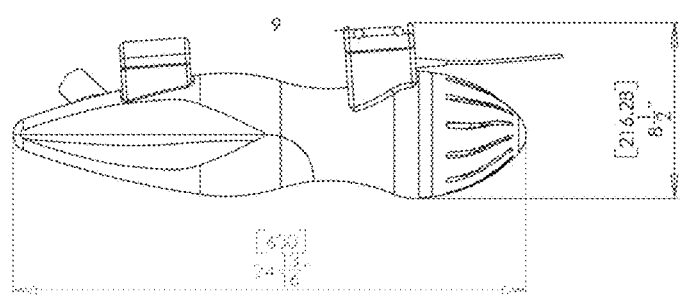
FRONT VIEW
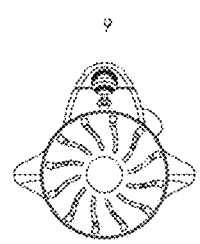
SIDE VIEW
FIGURE #4

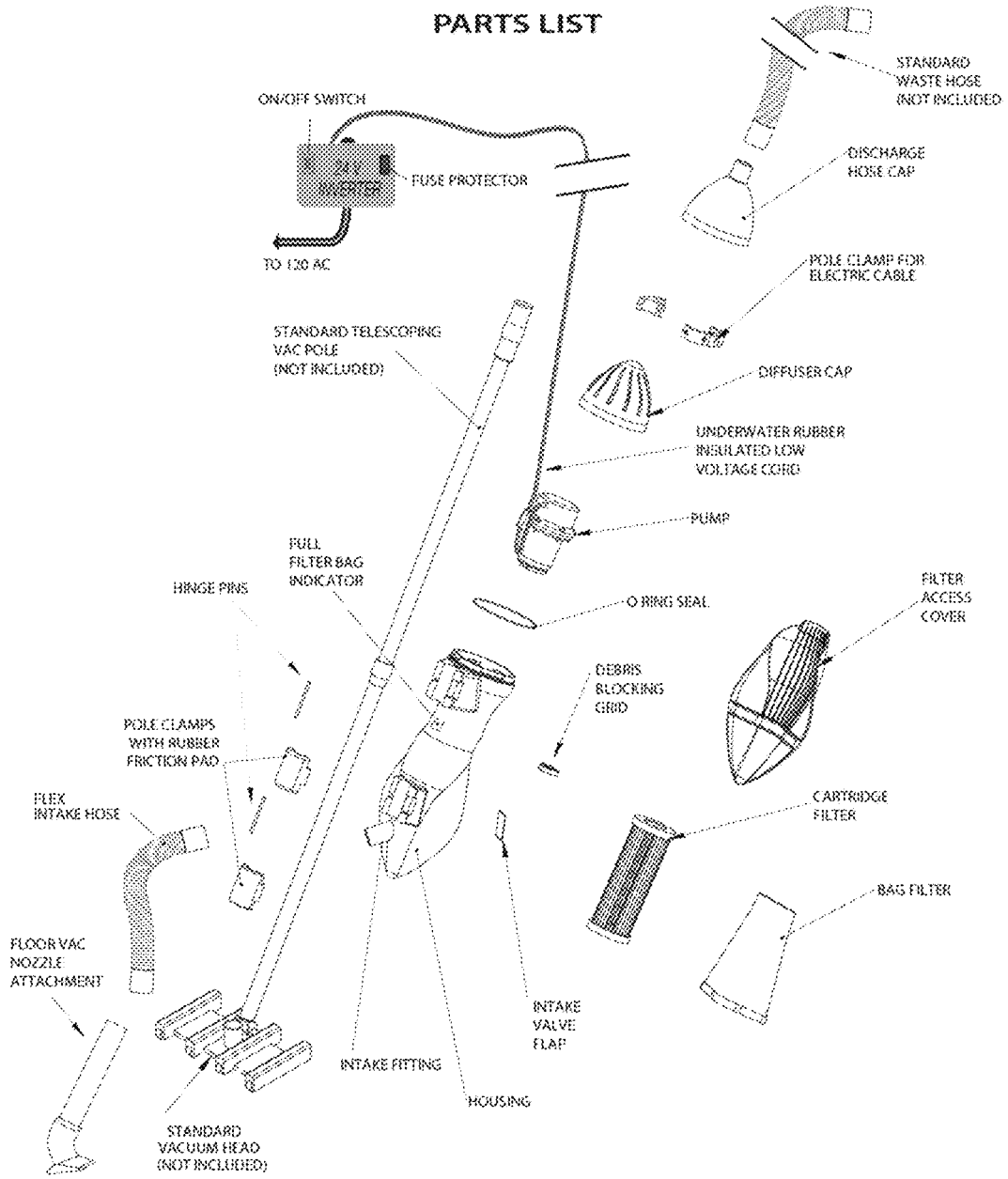
FIGURE #5

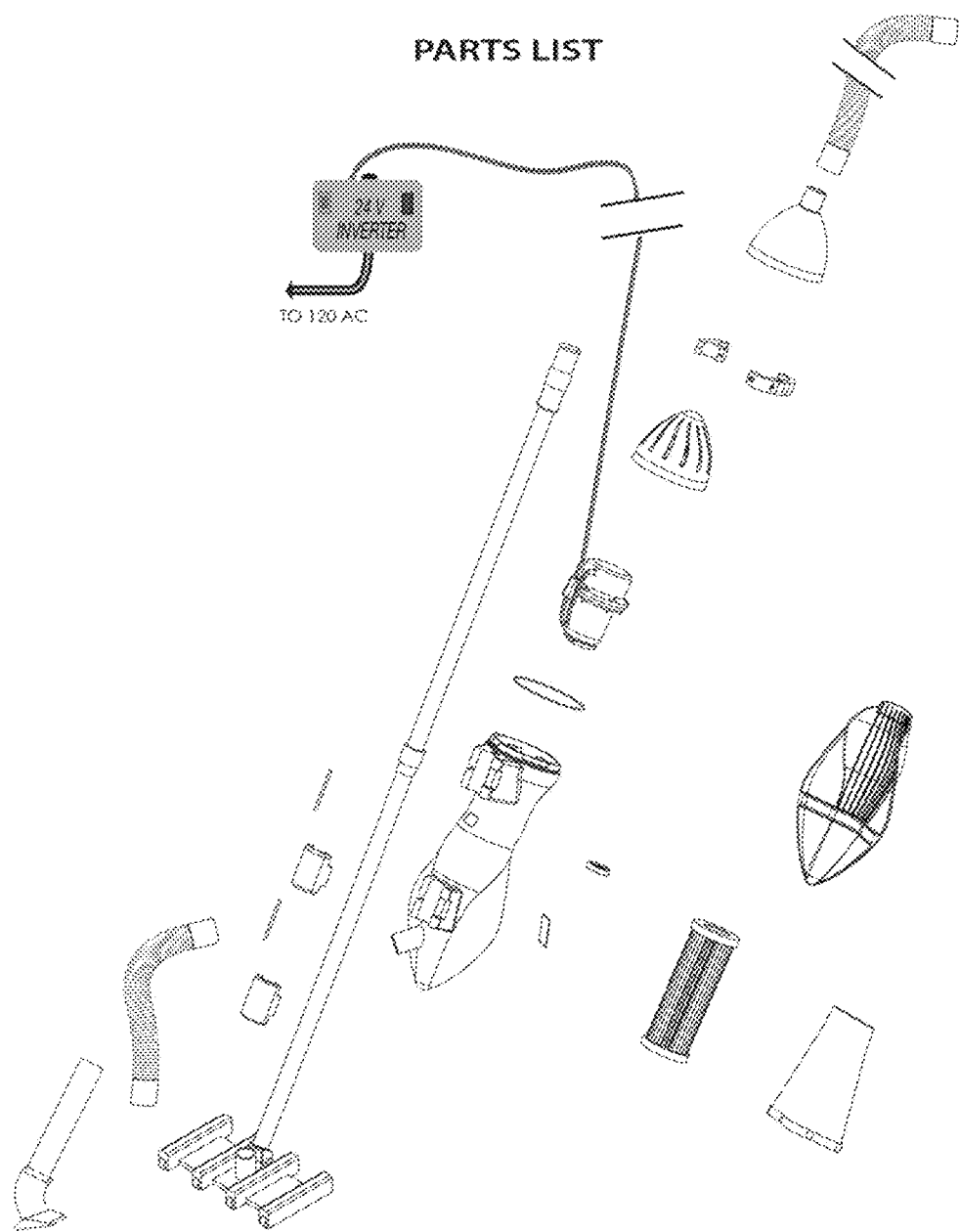
FIGURE #6

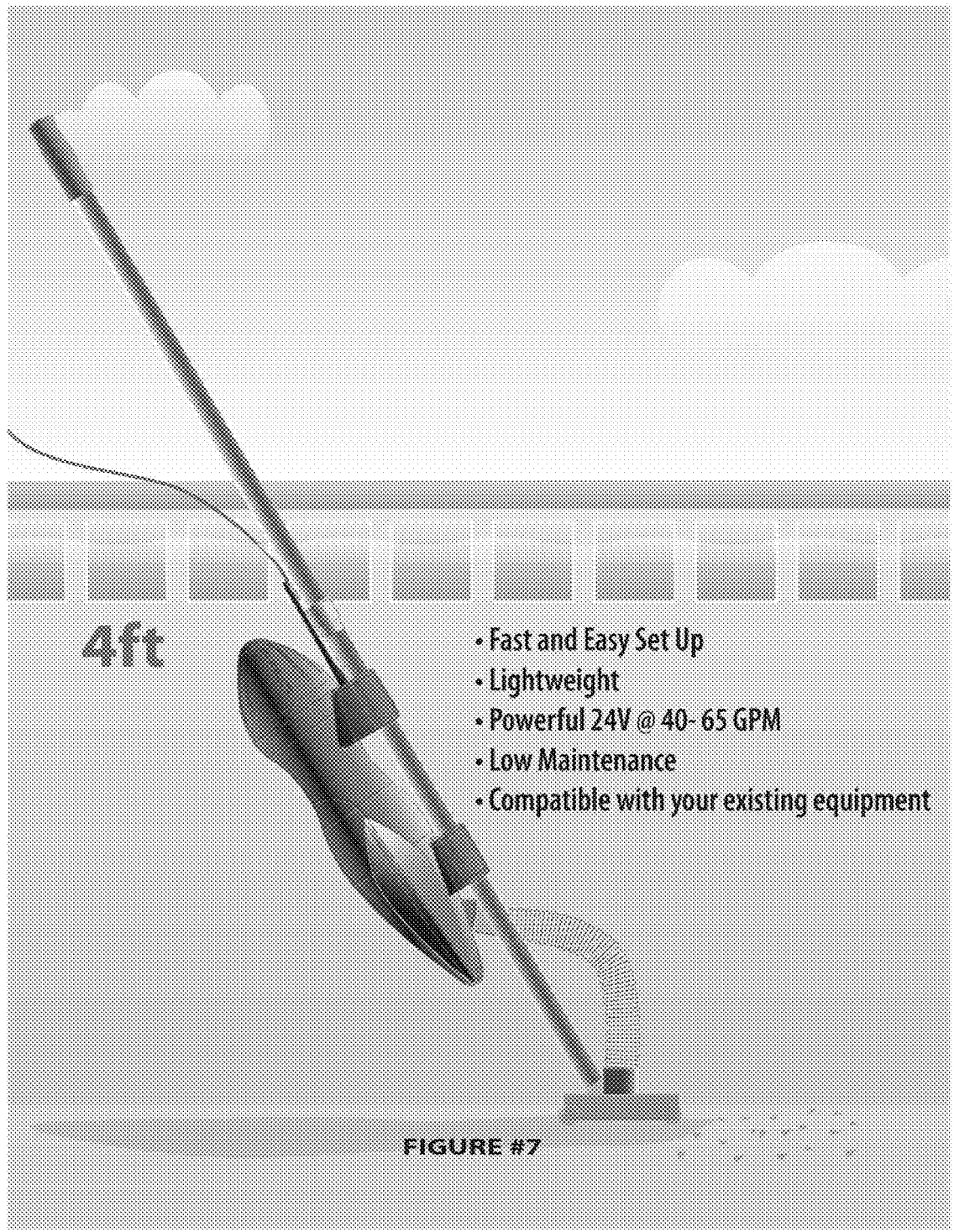
FIGURE #7

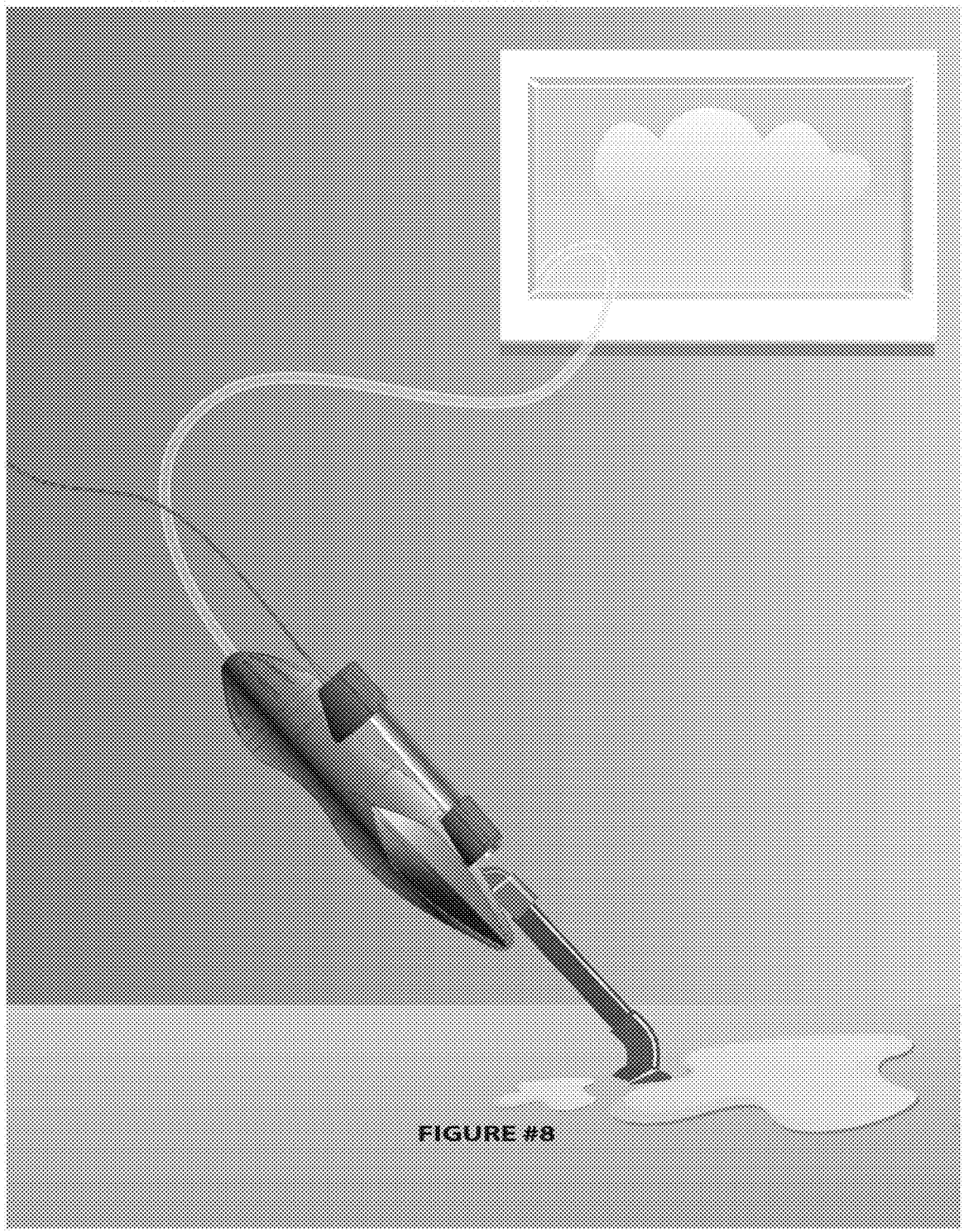

MULTI-FUNCTIONAL SUBMERSIBLE VACUUM

CROSS-REFERENCE TO RELATED APPLICATION

THIS APPLICATION CLAIMS THE BENEFIT OF AND PRIORITY TO U.S. PROVISIONAL APPLICATION NO. 62/197,386, FILED ON Jul. 27, 2015, the entire contents of which being incorporated by reference herein.

BACKGROUND OF INVENTION

Swimming pools accumulate debris over a period of time. Some of the debris is cleaned from the pool water as the water is recycled and filtered. Other debris sinks to the bottom of the pool and is not cleaned during water recycling and filtration. To clean the debris that sinks to the bottom of the pool, a swimming pool vacuum cleaner may be employed.

To achieve the foregoing and other advantages, the present invention, provides a new and improved swimming pool vacuum apparatus with a continuous external power source (not a battery), fully contained, powerful, portable vacuum including fuse protection. Other devices that have been created to solve this problem, but have been unsuccessful include hand-held battery operated systems, which have a finite application due to a limited battery life, an in-floor cleaning systems or a robotic device, both of which are extremely expensive, bulky and hard to use systems and other devices which use a power source which creates an electrocution risk.

1. Field of the Invention

This invention relates to a fully contained powerful portable pool vacuuming system. This is not a battery operated device. The invention has an unlimited power source, large diameter intake tube and strong 40-65 gpm water flow. The invention has a discharge port for vacuuming to waste and a secondary use of removing standing or pooling water from point A to point B.

2 Description of the Prior Art (Background of Invention)

Swimming pools accumulate debris over a period of time. Some of the debris is cleaned from the pool water as the water is recycled and filtered. Other debris sinks to the bottom of the pool and is not cleaned during water recycling and filtration. To clean the debris that sinks to the bottom of the pool, a swimming pool vacuum cleaner may be employed. In the swimming pool industry now, there exists only 5 ways to clean and filter debris from the floor of a pool.
1. In-floor cleaning systems—The In-floor systems can only be installed during the construction of the pool and are very expensive ($10,000-$30,000). They are not available to the average pool owner.
2. Robotic automatic pool cleaners—The robotic cleaners crawl on belts or driven on wheels automatically and clean/vacuum debris off the floor of the pool. They are fairly expensive ($900-$5,000) and are time consuming (average cleaning time 1½-3 hrs. to clean a pool).
3. A large vacuum hose connected to the existing pool equipment via a wall suction or skimmer line. A 1½×40'-50' vacuum hose is connected to a suction line looped into existing pool equipment. Many homeowners, commercial Hotels, and pool maintenance companies use this method of cleaning. Home owners have a difficult time learning how to prime (remove air and have water flow) the hose so they can vacuum. Carrying and storing a 50' hose is time consuming and inconvenient. This method also puts pool debris into the pool filter which then needs to be cleaned.
4. This method is for a person who has their own equipment (Homeowners, pool maintenance companies and Hotels use this method) which they have to carry to the side of the pool in order to vacuum. The equipment consists of a complete pump/motor (30-40 lbs), a large filter (10 lbs, 3' h×15" d), 40'-50' of 1½" vacuum hose which is carried to the pool and assembled. Priming a 50' hose is time consuming and difficult to learn. After vacuuming the pool, the 50' hose needs to be rolled up. The pump/motor, filter and hose are disassembled and then carried back to the work vehicle. Lugging the equipment to and from the pool area, assembling and disassembling the equipment are very time consuming and bulky work to do. Also, the equipment occupies considerable space in the work vehicles.
5. Hand held battery operated vacuum device—This method needs 4-10 hours of charging time before vacuum can be used. The battery vacuum device is connected to a standard swimming pool pole and vacuuming begins. The device has a possible 30-45 minute charge depending on condition of battery. The device is designed for spot cleaning a pool or complete cleaning of a spa/small body of water. This device cannot clean a large above ground or in ground pool as well as the previous 4 methods. This device has a short life span due to water and battery complications.

A number of swimming pool vacuum cleaners are disclosed in the prior art. For example, the following U.S. patents disclose swimming pool vacuum cleaner apparatus: U.S. Pat. No. 3,868,739 of Hargrave; U.S. Pat. No. 4,240,173 of Sherrill; U.S. Pat. No. 4,637,086 of Goode; U.S. Pat. No. 4,718,129 of Miller; U.S. Pat. No. 4,962,559 of Shuman; U.S. Pat. No. 7,060,182 B2 Erlich et al and U.S. Pat. No. 6,939,460 of Erlich.

The patents to Sherrill, Goode, and Miller disclose devices which employ a vacuum source outside the pool and provide a vacuum hose running from the vacuum source to the bottom of the pool. The devices disclosed in these patents avoid any potential problems that might result if water and electricity were to mix. Yet, a disadvantage of these devices is that a large and heavy vacuum hose must be employed. Use of such a large and heavy vacuum hose is undesirable for a number of reasons. Much physical effort must be expended so to unwind the hose, use the hose, and rewind the hose. The hose is susceptible to rotting and leaking, thereby reducing its effectiveness. A large hose requires quite a bit of storage space when the hose is not being used. It would be desirable; therefore, if a swimming pool vacuum apparatus were provided which avoided the use of a vacuum hose running from a vacuum source outside the pool to the bottom of the pool.

The patents to Hargrave and Shuman disclose swimming pool vacuum cleaners that avoid the use of long vacuum hoses by using submersible vacuum pumps. The vacuum pump in the Shuman patent is a cordless electric pump. A disadvantage of the Shuman device is that its effective use time is limited by the charge retained in its rechargeable batteries. In this respect, it would be desirable if a submersible swimming pool vacuum apparatus were provided which is not limited by a charge retained by rechargeable batteries.

The patent to Hargrave discloses a swimming pool vacuum cleaner which employs an electrical cord running from a submersible vacuum unit to a source of electricity, e.g. an AC outlet, outside the pool. It is well known that electricity and water do not mix. In this respect it does not appear that special provisions have been made with the Hargrave device to prevent electricity from being conducted from the underwater portions of the device to a person, outside the pool, using the device.

Thus, while the foregoing body of prior art indicates it to be well known to use submersible swimming pool vacuum cleaners, the prior art described above does not teach or suggest a submersible swimming pool vacuum apparatus which is not limited by a charge retained by rechargeable batteries and which provides electrical protection to protect a person outside the pool, who is using the underwater portion of the device, from electric shock or electrocution in the event that a short circuit develops in the underwater portion of the device. The prior art does not provide an electrical protection device in the electric circuit powering the submersible vacuum cleaner.

The patents of Erlich and Erlich et al. disclose a battery operated pool vacuum cleaner. The disadvantages of this patent are numerous. The vacuuming of a pool normally takes anywhere from 40 minutes to 1½ hours depending on the pool size. The Erlich patents and product literature claim up to 45 minutes of battery run time and to charge a battery takes anywhere from 4-10 hours. Depending on the battery's charge, 100%, 75%, 50% would affect whether you could clean one pool completely, then waiting 4-10 hrs. to continue the cleaning is a complete waste of time. The product seems to be a good idea on paper but in reality; the intake port has too small of a diameter to vacuum large leaves, the vacuum has a restricted limit to how long the battery lasts, the motor only has 8 gpm of suction power. The 8 gpm is not enough to handle cleaning an average pool. After the battery loses its charge, after attempting to clean one pool—How can a professional vacuumer clean a second pool when the battery is dead? Water contamination with battery components destroys the device. More specifically with respect to Erlich et al, their vacuum power (water flow gpm) is too weak for any large body of water being cleaned properly. Water and batteries submerged in water do not function well together. The largest customer complaint is battery failure.

It would be advantageous for a portable vacuum to have a continuous power source, to be powerful enough to clean all debris (large and small) that accumulates in said body of water and to provide protection for user from electrocution.

The foregoing disadvantages are overcome by the unique swimming pool vacuum apparatus of the present invention as will be made apparent from the following description thereof. Other advantages of the present invention over the prior art also will be rendered evident.

BRIEF SUMMARY OF THE INVENTION

The present invention consists of a cylindrical housing, a direct current (DC) underwater pump, a 120 volt AC to 24 volt DC converter, a filter, an underwater low voltage cord and a clamp system to attach to a universal pool telescoping pole.

The cylindrical housing is attached via clamps parallel with a universal/standard pool telescoping pole and any vacuum head appropriate for the pool surface. A short length of 1.5 inch corrugated vacuum hose attaches to vac head and suction side of cleaner. A DC volt pump enclosed in the housing (6-8 inches in diameter) produces 40-65 gpm of water suction, pulling water through a filter cartridge, bag or screen. The water discharges out the other end of the housing through a diffuser cap back into the pool and/or the diffuser hose cap can be used to discharge the water to waste.

BRIEF DESCRIPTION OF THE DRAWINGS

FIG. 1 Parts 20-24
20—The discharge hose cap
21—The pole clamp
22—The housing mechanism
23—The floor vac nozzle attachment
24—The pole clamp for electric cable
11—Bag Filter (Also referenced in FIG. 3)
FIG. 2 Parts 0-4
0—The water tight on/off switch
1—The male 110 volt grounded plug
1.5—The inline fuse protection
2—The pig tail
3—The 12-24 volt converter
4—The underwater rubber insulated low voltage cord
FIG. 3 Parts 5-19
5—The diffuser cap
6—The electric cord connector
7—The full filter bag indicator
8—The filter access cover
9—The housing mechanism
10—The debris blocking grid
11—The bag filter
12—The cartridge filter
13—The intake valve flap
14—The intake fitting
15—The pole clamps with lock and rubber friction pad (×2)
16—
16—The flex intake hose
17—The hinge pins (×2)
18—The pump
19—The o ring seal
FIG. 4
9—The housing mechanism—Top View
9—The housing mechanism—Front View
9—The housing mechanism—Side View
FIG. 5 The Complete Vacuum System with Labels
The complete vacuum system—with parts labeled
FIG. 6 The Complete Vacuum System without Labels
The complete vacuum system—without parts labeled
FIG. 7
The side view of the invention submerged in a pool
FIG. 8
The side view of the invention in a room vacuuming water from point A to point B

DESCRIPTION OF THE PREFERRED EMBODIMENT

With reference to the drawings, a new and improved swimming pool vacuum apparatus embodying the principles and concepts of the present invention will be described.

As described herein, FIG. 1-4 illustrates an unlimited external power source, self-contained, pump and filter vacuum device (not battery operated).

The vacuum (FIG. 1, 22 and 11) is capable of vacuuming debris (silt, sand, dirt, leaves and water from the bottom of pool) and filtering the water from the bottom of pool. The filtered water is then dispensed through the diffuser cap (FIG. 3, 5) back into the pool. As a secondary method of removing debris there exists a discharge hose cap (FIG. 1, 20) that allows water with debris to be removed out of the pool completely (vacuum to waste).

The vacuum (FIG. 1, 22 and 11) has extremely powerful suction (40-65 gpm) and provides excellent removal of underwater debris (sand, leaves, silt, dirt, etc., and water). A second application of the vacuum is used for removing (to another location via a waste hose) water from a flood event or a pooling body of water. This application removes the water a sump pump cannot remove. The portable vacuum replaces a cumbersome wet/dry vacuum and the need to constantly empty the container.

As shown in FIG. 1, the vacuum (FIG. 1, 22 and 11) is a light weight molded plastic approximately 24 inches long and 7 inches wide. The pump (FIG. 3, 18) inside the vacuum is powered by a 24 volt converter (FIG. 2, 3), the converter (FIG. 2, 3) has a pig tail attached (FIG. 2, 2) that is connected to a male 110 volt plug (FIG. 2, 1) that plugs into an outdoor extension cord or wall outlet. The converter (FIG. 2, 3) has water tight on/off switch (FIG. 2, 0) and built-in fuse protection (FIG. 2, 1.5). The converter (FIG. 2, 3) has a 50 foot underwater rubber insulated low voltage cord (FIG. 2, 4) that connects with the pump (FIG. 3, 18) in the housing mechanism (FIG. 3, 9). The vacuum (FIG. 1, 22 and 11) connects to a standard pool pole (not included) via 2 pole clamps (FIG. 1, 21) with rubber friction pad (FIG. 3, 15) and secured with hinge pins (FIG. 3, 17) is fastened to vac pole approximately 42 inches from the vac head. The intake fitting (FIG. 3, 14) connects to a 1.5 inch flex intake hose (FIG. 3, 16) then the 1.5 inch flex intake hose (FIG. 3, 16) connects to the vacuum head (not included). The vacuum (FIG. 1, 22 and 11) is engaged by plugging male plug (FIG. 2, 1) into standard 110/120 electric outlet via an outdoor extension cord. The vacuum (FIG. 1, 22 and 11) is clamped onto the pool pole, 1.5 inch flex intake hose (FIG. 3, 16) is connected to vacuum head and intake fitting (FIG. 3, 14) and the complete vacuum, pole and vacuum head are placed in the pool. The 50 foot underwater rubber insulated low voltage cord (FIG. 2, 4) is clamped onto the vacuum pole with the pole clamp (FIG. 1, 24) which is connected to the converter and then turn the converter (FIG. 2, 3) on and start vacuuming. The pump (FIG. 3, 18) is a 24 DC volt underwater pump capable of moving 40-65 GPM. The pump (FIG. 3, 18) is engaged and starts pumping water. Water suction is created in the intake fitting (FIG. 3, 14) and water begins its journey through the vacuum (FIG. 1, 22 and 11). The intake valve flap (FIG. 3, 13) opens to allow water to run through the filter (FIG. 3, 11 and 12). The filter is interchangeable with a filter bag (FIG. 3, 11), a fine or coarse mesh bag filter, fine metal screen filter, or a pleated cartridge filter (FIG. 3, 12). After the water is filtered through the housing (FIG. 3, 9) of the vacuum it passes through a debris blocking grid (FIG. 3, 10) to protect the impeller of pump from damage. The water passes through the pump (FIG. 3, 18) and is released through a diffuser cap (FIG. 3, 5) into the pool. Theo ring seal (FIG. 3, 19) creates a water/air tight seal between the discharge hose cap (FIG. 1, 20) and/or diffuser cap (FIG. 3, 5). The discharge hose cap (FIG. 1, 20) replaces the diffuser cap (FIG. 3, 5) for the option to vacuum water and debris out of pool completely (vacuum to waste), using a waste hose connected to the discharge hose cap (FIG. 1, 20). The discharge hose cap (FIG. 1, 20) is used for the second application of removing pooling water from point A to point B. The floor vac nozzle attachment (FIG. 1, 23) is connected to the intake fitting (FIG. 3, 14) for this second application.

The vacuum (FIG. 1, 22 and 11) easily assembles and has many advantages in function. The intake valve flap (FIG. 3, 13) stops debris from re-entering the pool when vacuum (FIG. 1, 22 and 11) is removed from the pool. The filter access cover (FIG. 3, 8) is for easy access and cleaning of the filter. For further ease of use, there is a full filter bag indicator (FIG. 3, 7) to notify user when to clean filter bag. The underwater rubber insulated low voltage cord (FIG. 2, 4) connector fitting (FIG. 3, 6) protects the cord (FIG. 2, 4) from being disconnected from the pump (FIG. 3, 18). The two vacuum pole clamps (FIG. 3, 15) attach to housing mechanism (FIG. 3, 9). The intake fitting (FIG. 3, 14) is a standard 1.5 inch fitting to accept large debris without clogging. A 24 DC volt converter (FIG. 2, 3) is a continuous power source . . . there is no charging batteries; mixing water with batteries is always a problem. No need to replace batteries, vacuum pump never loses power with direct external power source.

DETAILED DESCRIPTION OF THE INVENTION AND BEST MODE OF IMPLEMENTATION

The present invention consists of a cylindrical housing, a direct current (DC) underwater pump, a 120 volt AC to 24 volt DC converter, a filter, an underwater low voltage cord and a clamp system to attach to a universal pool telescoping pole.

The cylindrical housing is attached via clamps parallel with a universal/standard pool telescoping pole and any vacuum head appropriate for the pool surface. A short length of 1.5 inch corrugated vacuum hose attaches to the vac head and suction side of cleaner. A DC volt pump enclosed in the housing (6-8 inches in diameter) produces 40-65 gpm of water suction, pulling water through a filter cartridge, bag or screen. The water discharges out the other end of the housing through a diffuser cap back into the pool and/or the discharge hose cap can be used to discharge the water to waste.

This multi-purpose wet vacuum is al 10 v powered fully submersible multi-port discharge design system. The unit is designed to draw water through an inlet at the base of the unit by means of suction which is created by a centrifuge pump located in the general housing mechanism and is powered by an electric motor. The suction created pulls water to a filter housing which contains a reusable-cleanable wet particle filter that has a life expectancy. The water passes through the filter and can be discharged to its point of origin or it can be discharged to a point which is not part of the origin supply. The result is water containing suspended particulate in the origin supply will be filtered as it passes through the filter and the result is cleaner water will be discharged out of the unit. Water can also be passed to a different location by replacing the diffuser cap with the discharge hose cap. The unit can discharge water from a location (A) to a completely different location (B) through use of interchangeable caps connecting to the housing mechanism. The unit has the mobility of a vacuum and the ability to continually discharge water for extended periods of time.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be the subject matter of the claims appended hereto.

In this respect, before explaining at least two preferred embodiments of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such in equivalent constructions insofar as they do not depart from the spirit and scope of the present invention.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application.

Accordingly, the Abstract is neither intended to define the invention or the application, which only is measured by the claims, nor is it intended to be limiting as to the scope of the invention in any way.

It is therefore an object of the present invention to provide a new and improved swimming pool vacuum apparatus which has all of the advantages of the prior art and none of the disadvantages.

Still yet a further object of the present invention is to provide a new and improved swimming pool vacuum apparatus which vacuums the pool without using the pool filter apparatus.

Still another object of the present invention is to provide a new and improved swimming pool vacuum apparatus which avoids the use of a vacuum hose running from a vacuum source outside the pool to a vacuuming unit located on the bottom of the pool.

Yet another object of the present invention is to provide a new and improved swimming pool vacuum apparatus that includes a submersible swimming pool vacuum unit which is not limited by a charge retained by rechargeable batteries.

Even another object of the present invention is to provide a new and improved swimming pool vacuum apparatus that protects a person outside the pool, who is using the underwater portion of the device, from electric shock or electrocution in the event that a short circuit develops in the underwater portion of the device.

The main object of the present invention is to have a portable, powerful pool vacuum that eliminates the problems of the five current methods of cleaning a pool. The present invention is more powerful, more durable, longer lasting, much quicker and more convenient than any other method that exists.

Still a further object of the present invention is to provide a new and improved swimming pool vacuum apparatus that employs an electrical protection in the electric circuit powering the submersible vacuum cleaner.

Still another object of the present invention is to provide a new and improved wet/dry vacuum apparatus that allows for the moving of standing water from point A to point B, while it protects a person, who is using the device, from electric shock or electrocution in the event that a short circuit develops in the device.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

The invention claimed is:

1. A liquid-submersible vacuum cleaner, comprising:
a housing defining a chamber therein and having a rear end portion and a front end portion;
a discharge hose cap configured to be detachably coupled to the rear end portion of the housing, wherein the discharge hose cap is configured to be coupled to a hose to allow for the passage of water out of the housing;
a diffuser cap configured to be coupled to the rear end portion of the housing;
a DC pump disposed within the chamber and configured to move water toward the rear end portion of the housing;
a filter disposed within the housing, such that water moves through the filter during activation of the DC pump; and
a power converter electrically connected to the DC pump for providing power to the DC pump, wherein the power converter is located remotely from the housing.

2. The liquid-submersible vacuum cleaner according to claim 1, wherein the DC pump is configured to be activated upon actuation of the power converter.

3. The liquid-submersible vacuum cleaner according to claim 1, further comprising a low voltage power cord directly coupling the power converter and the DC pump.

4. The liquid-submersible vacuum cleaner according to claim 3, wherein the low voltage power cord has a front end portion attached to the DC pump at a location within the housing.

5. The liquid-submersible vacuum cleaner according to claim 1, wherein the DC pump is configured to generate a flow rate of between about 40 gallons-per-minute (GPM) and about 65 GPM of water.

6. The liquid-submersible vacuum cleaner according to claim 1, wherein the diffuser cap defines a plurality of slits therein to allow for the passage of water out of the housing.

7. The liquid-submersible vacuum cleaner according to claim 1, wherein the discharge hose cap and the diffuser cap are selectively exchangeable with one another, such that in a first operation mode, the discharge hose cap is coupled to the rear end portion of the housing, and in a second operation mode, the diffuser cap is coupled to the rear end portion of the housing.

8. The liquid-submersible vacuum cleaner according to claim 7, further comprising a nozzle attachment configured to be coupled to the housing when the vacuum cleaner is in the first operation mode and detached from the housing when the vacuum cleaner is in the second operation mode.

9. The liquid-submersible vacuum cleaner according to claim 1, further comprising a pair of clamps attached to the housing and being longitudinally spaced from one another, the pair of clamps configured to releasably couple the housing to a pool pole.

10. The liquid-submersible vacuum cleaner according to claim 1, further comprising a flexible intake hose, wherein the housing includes a port configured to provide fluid communication between the chamber of the housing and the flexible intake hose.

11. The liquid-submersible vacuum cleaner according to claim 1, further comprising an intake valve flap disposed within the housing for inhibiting debris from moving toward the front end portion of the housing.

12. The liquid-submersible vacuum cleaner according to claim 1, wherein the power converter includes a fuse protector.

13. The liquid-submersible vacuum cleaner according to claim 1, further comprising a filter access cover detachably coupled to the housing, wherein the housing and the filter access cover collectively house the filter therein.

14. A liquid-submersible vacuum cleaner, comprising:
   a housing having a front end portion and a rear end portion;
   a DC pump disposed within the housing and configured to move water into, through, and out of the housing;
   a filter disposed within the housing, such that water moves through the filter during activation of the DC pump;
   a diffuser cap and a discharge hose cap, wherein the discharge hose cap and the diffuser cap are selectively exchangeable with one another, such that in a first operation mode, the discharge hose cap is coupled to the rear end portion of the housing, and in a second operation mode, the diffuser cap is coupled to the rear end portion of the housing;
   a nozzle attachment configured to be coupled to the housing when the vacuum cleaner is in the first operation mode and detached from the housing when the vacuum cleaner is in the second operation mode.

15. The liquid-submersible vacuum cleaner according to claim 14, further comprising a power converter electrically connected to the DC pump for providing power to the DC pump.

16. The liquid-submersible vacuum cleaner according to claim 15, further comprising a low voltage power cord directly coupling the power converter and the DC pump.

17. The liquid-submersible vacuum cleaner according to claim 16, wherein the low voltage power cord has a front end portion attached to the DC pump at a location within the housing.

18. The liquid-submersible vacuum cleaner according to claim 15, wherein the power converter is located externally of the housing.

* * * * *